United States Patent [19]

Nakayama et al.

[11] Patent Number: 5,060,214
[45] Date of Patent: Oct. 22, 1991

[54] OPTICAL PICKUP DEVICE KEEPING COINCIDENT THE OPTICAL AXES OF THE OBJECTIVE LENS AND OF THE RECORDING/REPRODUCING BEAM

[75] Inventors: Masahiko Nakayama; Toshihiro Shigemori; Haruhiko Kono; Kiyoshi Yokomori, all of Yokohama, Japan

[73] Assignee: Ricoh Company, Ltd., Tokyo, Japan

[21] Appl. No.: 383,029

[22] Filed: Jul. 20, 1989

[30] Foreign Application Priority Data

Jul. 21, 1988 [JP] Japan ................................. 63-182601

[51] Int. Cl.$^5$ ................................................ G11B 7/00
[52] U.S. Cl. ................................ 369/44.26; 369/44.41
[58] Field of Search ............. 369/32, 33, 44.26–44.25, 369/44.41

[56] References Cited

U.S. PATENT DOCUMENTS 4,564,929 1/1986 Yonezawa et al. ............... 369/44.26
4,710,909 12/1987 Tsuyoshi et al. ................. 369/44.26
4,751,695 6/1988 Kaku et al. ..................... 369/44.32 X

FOREIGN PATENT DOCUMENTS 49133 2/1989 Japan .

Primary Examiner—Robert L. Richardson
Attorney, Agent, or Firm—Cooper & Dunham

[57] ABSTRACT

An optical pickup device for an optical recording disk having an information recording surface comprises an objective lens for converging a light beam emitted from a light source onto the information recording surface of the disk so as to form a beam spot thereon along an information track of the disk. At least one light detecting unit comprised of a plurality of photodetectors is provided for the detection of focus and tracking errors and the detection of the position of the optical axis of the objective lens. Each of the photodetectors is able to receive a light beam reflected by the information recording surface of the disk and to produce an output signal which is proportional to the amount of the light beam incident thereon. At least two photodetectors of the light detecting unit are separated from each other through a separation line which is optically parallel to a tangent to the information track of the disk so that a differential signal corresponding to the difference between the levels of the output signals produced by the two photodetectors can be obtained as a lens position detection signal which is used for the detection of position of the optical axis of the objective lens in relation to the photodetectors.

6 Claims, 7 Drawing Sheets

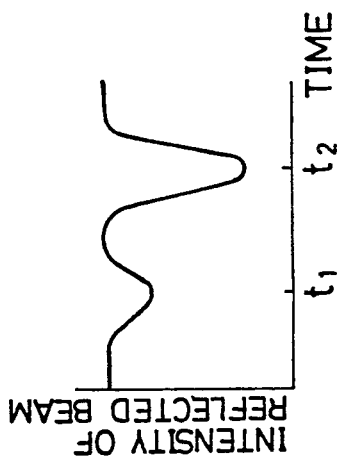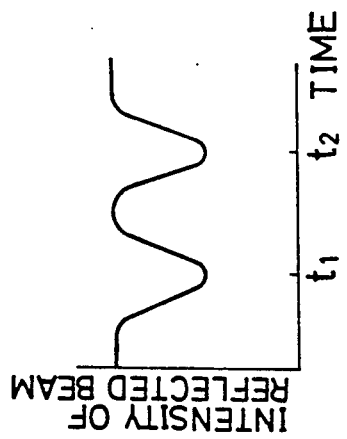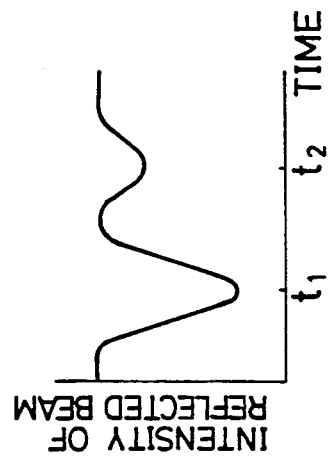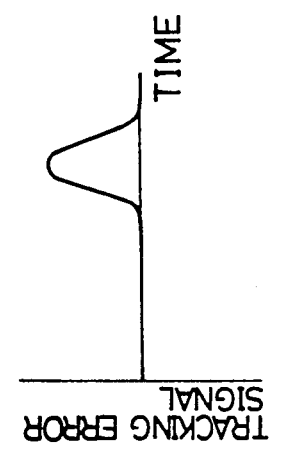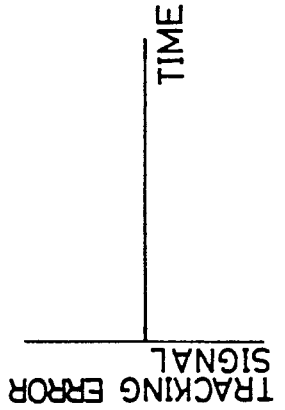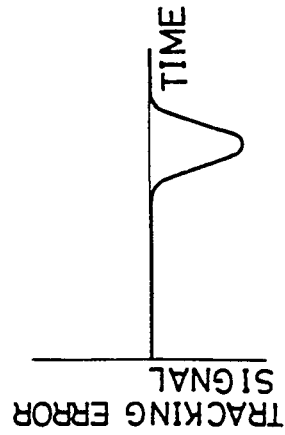

Fig. 8(a)  Fig. 8(b)
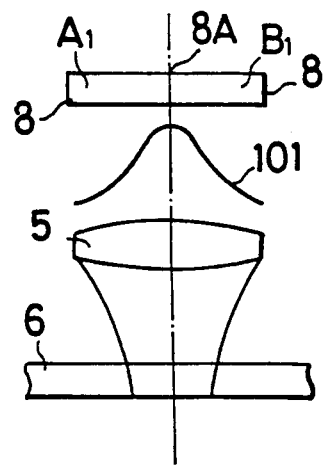
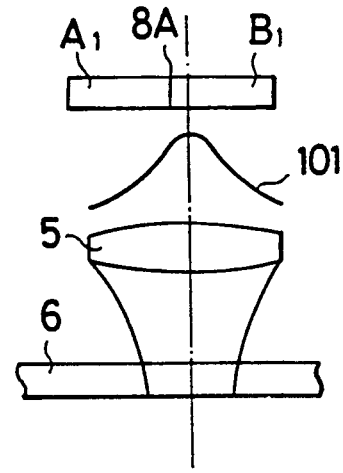
Fig. 9
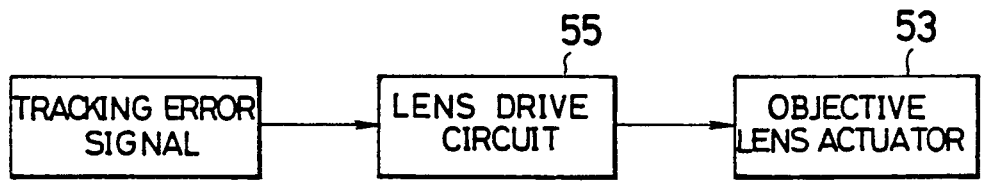
Fig. 10
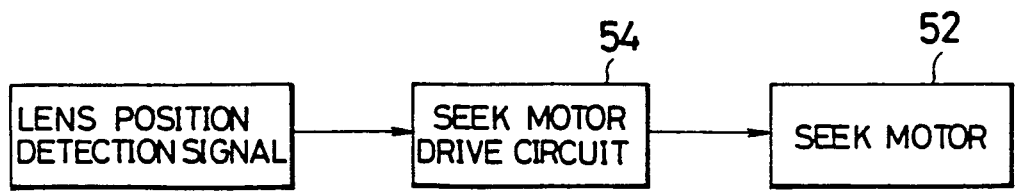

OPTICAL PICKUP DEVICE KEEPING COINCIDENT THE OPTICAL AXES OF THE OBJECTIVE LENS AND OF THE RECORDING/REPRODUCING BEAM

BACKGROUND OF THE INVENTION

The present invention relates generally to an optical pickup device for an optical information recording and-/or reproducing apparatus using an optical recording medium such as optical disk, magneto-optical disk or the like.

Generally, a conventional optical pickup device of an optical information recording and/or reproducing apparatus comprises an objective lens which acts to converge a laser beam emitted from a semiconductor laser onto an optical recording disk so as to form a very small beam spot on an information recording track of the optical recording disk. In order to correct focus and tracking errors of the objective lens in relation to the optical recording medium, the objective lens is so constructed as to be slightly moved by a bidirectional actuator in a first direction perpendicular to the information track of the optical recording disk and a second which is normal to the disk surface. In the conventional optical pickup device of this type, generally, the reflected (or return) beam from the optical recording disk passes through the objective lens, quarter-wave plate, and polarized beam splitter. On the return trip, the beam is split by a beam splitter into two parts, one being used as a tracking error signal for the detection of tracking error and the other being used as a focus error signal for the detection of focus error.

As a method for detecting the tracking error of the laser beam converged by the objective lens in relation to the information track of the optical recording disk, there has been well known a push-pull method in which a set of two photodiodes is used for comparing the amount of laser beams incident on the respective photodiodes. The two photodiodes are separated from each other through a separation line.

On the other hand, as a method for detecting the focus error of the objective lens, there has been well known an astigmatic method in which a set of four photodiodes is used with convex and cylindrical lenses, for comparing the amount of incident beam on the respective photodiodes. The four photodiodes are separated from each other through separation lines. An information signal can be obtained by at least either of the above-mentioned two sets of the photodiodes.

However, generally, the push-pull method has an disadvantage in that an error is apt to occur in the tracking error signal due to a generation of deviation of the optical axis of the objective lens from the separation line between the two photodiodes.

In order to reduce the above-mentioned error in the tracking error signal, the conventional optical pickup device has been provided with a light emitting diode, which is secured to the objective lens, and an additional photodiode for detecting the light emitted from the light emitting diode. Namely, the additional photodiode is adapted to produce a lens position detection signal when the optical axis of the objective lens is deviated from the separation line between the two photodiodes is detected, and the actuator for the objective lens acts to minimize the deviation of the optical axis of the objective lens in accordance with the lens position detection signal.

However, the above-mentioned light emitting diode and additional photodiode causes the optical pickup device to be increased in size and complicated in construction. Particularly, the light emitting diode secured to the objective lens causes the load of the actuator for the objective lens to be increased, resulting in a large-sized and complicated objective driving system.

SUMMARY OF THE INVENTION

Therefore, it is an object to provide an optical pickup device for an optical information recording disk, which makes it possible to detect accurately focus and tracking errors of the optical information recording disk in relation to the optical pickup device, with a simple and compact-sized construction.

Further object of the present invention is to provide an optical pickup device which makes it possible to detect the deviation of the position of the optical axis of the objective lens in relation to the photodetectors which are to be used for detecting the focus and tracking errors of the optical information recording disk in relation to the optical pickup device, with a simple and compact drive system for driving the objective lens.

According to the present invention, it is provided an optical pickup device for performing recording and/or reproduction of an optical information for an optical recording disk having an information recording surface, comprising: an objective lens for converging a light beam emitted from a light source onto the information recording surface of the optical recording disk so as to form a beam spot thereon along an information track of the optical recording disk; and at least one light detecting unit comprised of a plurality of photodetectors each of which is able to receive a light beam reflected by the information recording surface of the optical recording disk and to produce an output signal which is proportional to the amount of the light beam incident thereon, wherein at least two photodetectors of the light detecting unit are separated from each other through a separation line which is optically parallel to a tangent to the information track of the optical recording disk so that a differential signal corresponding to the difference between the levels of the output signals produced by the two photodetectors can be obtained as a lens position detection signal which is used for the detection of position of the optical axis of the objective lens in relation to the photodetectors.

In the above-mentioned construction of the present invention, the two photodetectors are respectively adapted to generate an electric signal which is proportional to the amount of a laser beam incident on the corresponding photodetector. A lens position detection signal is obtained by comparing the two electric signals from the photodetectors. These photodetectors can be used for the detection of the focus and/or tracking error. This means that it is unnecessary to provide an additional position detecting means on the objective lens.

Accordingly, it is possible to detect the deviation of the position of the optical axis of the objective lens in relation to the photodetectors which are used for detecting the focus and tracking errors of the disk in relation to the optical pickup device, with a simple and compact drive system for driving the objective lens. Therefore, the optical pickup device according to the present invention makes it possible to detect accurately the focus and tracking errors of the optical disk in relation to the optical pickup device, with a simple and compact-sized construction of the optical pickup device.

Preferably, the information recording surface of the optical recording disk includes a pair of pits which are used for the detection of a tracking error of the light beam in relation to the information track of the optical recording disk and which are located at opposite sides of the center line of the information track and spaced from one another in a direction along the center line of the information track. A a plane mirror portion is formed on the information track of the optical recording disk so that the detection of position of the optical axis of the objective lens can be performed by using a light beam reflected by the plane mirror portion only.

Further objects, features and advantages of the present invention will become apparent from the following description of the preferred embodiments of the present invention as illustrated in the accompanying drawings.

BRIEF DESCRIPTION OF THE DRAWINGS

FIGS. 6(a) to 6(c) are views illustrating changes in the intensity of a light beam reflected by the optical disk, respectively, which are obtained when the beam spot passes through the pits of the optical recording disk shown in FIG. 5;

FIGS. 7(a) to 7(c) are views illustrating respective tracking error signals which are obtained by a differential-signal producing process from the output signal of the two photodetectors, which are proportional to the amount of the reflected light beam shown in FIGS. 6(a) to 6(c), respectively;

FIGS. 8(a) and 8(b) are views for explaining examples of positional relationship between the objective lens, the intensity distribution of a light beam, and the set of two photodetectors, respectively;

FIG. 10 is a block diagram of a driving system for a seeking motor;

FIG. 9 is a block diagram of a driving system for an objective lens actuator;

DESCRIPTION OF THE PREFERRED EMBODIMENTS

FIGS. 1 to 10 show a first embodiment of the present invention.

Figure 1:
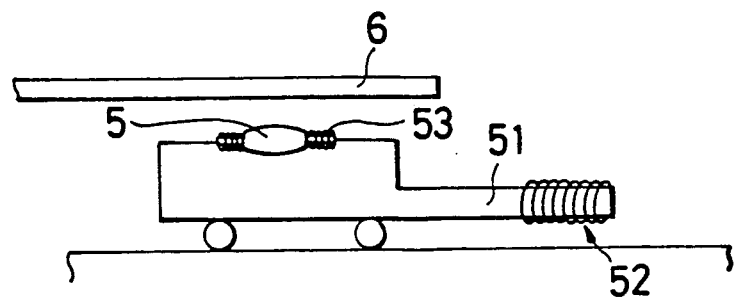
FIG. 1 is a view schematically illustrating an optical pickup device according to a preferred embodiment of the present invention.

Referring to FIG. 1, there is schematically shown an optical information recording/reproducing apparatus, in which an optical pickup device according to the present invention is provided below an optical information recording disk (referred to as optical disk, hereinafter) 6. The optical disk 6 has at the underside thereof a information recording surface and is driven by a disk drive motor (not shown) for rotation about the center thereof.

In the present embodiment, a plurality of spaced pits to be used for the record of information data are formed on the information recording surface of the optical disk 6 along a predetermined information track having a spiral pattern. The radial pitch of the information track is about 1.6 μm, for example. The pits and lands or flat areas between each pit together correspond to a sequence of digital information data. Alternatively, a plurality of coaxial information tracks may be formed on the information recording surface of the optical disk 6.

The optical pickup device comprises a movable pickup body 51 which is driven by a seek motor 52 for the seeking movement along a predetermined seeking direction which is perpendicular to the information track of the optical disk 6.

The pickup body 51 is provided with an objective lens 5 for converging a laser beam as a light beam emitted from a semiconductor laser as a light source (not shown in FIG. 1) onto the information recording surface of the optical disk 6 so as to form a very small beam spot on the information track of the optical disk 6. The objective lens 5 is movable with respect to the pickup body 51 in a predetermined first direction which is perpendicular to the information track of the optical disk 6 and in a second direction normal to the information recording surface of the optical disk 6, i.e., a focusing direction of the objective lens 5. The pickup body 51 is also provided with a bidirectional actuator 53 as an objective lens actuator for correcting focus and tracking errors of the optical disk 6 by moving the objective lens 5 in the above-mentioned first and second directions in relation to the pickup body 51.

Figure 2:
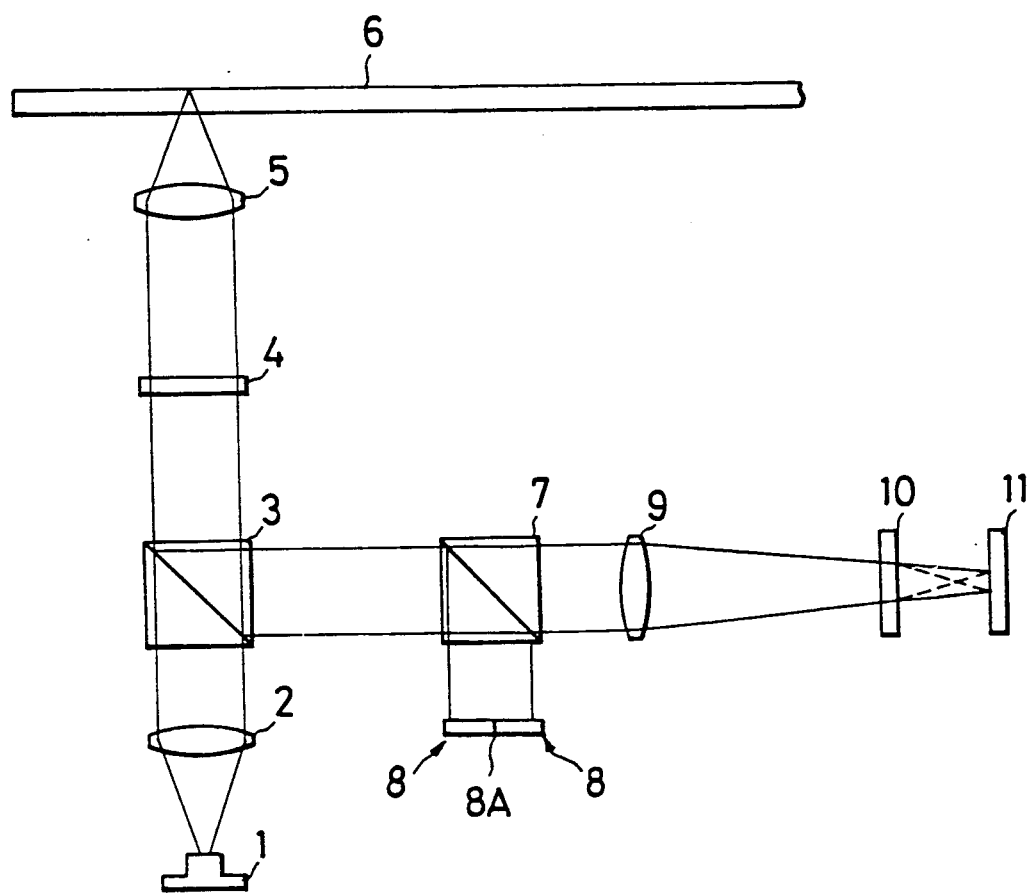
FIG. 2 is a view diagrammatically illustrating an optical system of the optical pickup device shown in FIG. 1.

FIG. 2 is a diagrammatical side view of an optical system of the optical pickup device shown in FIG. 1.

Referring to FIG. 2, the optical pickup device comprises a set of two photodetectors 8 and a set of four photodetectors 11. Each of these sets serves as a light detecting unit. Photodiodes may be used as the photodetectors 8 and 11, for example.

In this embodiment, the set of two photodetectors 8 is used for detecting the position of the optical axis of the objective lens 5 with respect to the photodetectors 8 and 11, while the set of four photodetectors 11 is used for an astigmatism method for detecting a focus error of the optical disk 6. Further, in this embodiment, either the set of two photodetectors 8 or the set of four photodetectors 11, or both of them can be used for the tracking error detection according to the pre-wobbling method. Furthermore, an information signal can be obtained by either the set of two photodetectors 8 or the set of four photodetectors 11.

Referring to FIG. 2, a laser beam emitted from the semiconductor laser passes through a coupling lens 2, polarized beam splitter 3, and quarter-wave plate 4, and is then converged by the objective lens 5 onto the information recording surface of the optical disk 6, thereby making a beam spot of about 1 μm diameter on the information recording surface of the optical disk 6.

The laser beam is reflected back from the optical disk 6. The reflected laser beam passes through the objective lens 5 and the quarter-wave plate 4, and is then deflected by the polarized beam splitter 3 toward a beam splitter 7 where the laser beam is split into two beams. One of the beams coming from the beam splitter 7 falls on the set of two photodetectors 8, while the other beam coming from the beam splitter 7 passes through a convex lens 9 and cylindrical lens 10, and falls on the set of four photodetectors 11.

The other beam coming from the beam splitter 7 falls on the set of two photodetectors 8 which are separated from one another with a separation line 8A. The amount of the incident beam is detected by each of the photodetectors 8. In this embodiment, the two photodetectors 8 are used at least for the detection of the position of the optical axis of the objective lens 5, as described later in detail.

Figure 3:
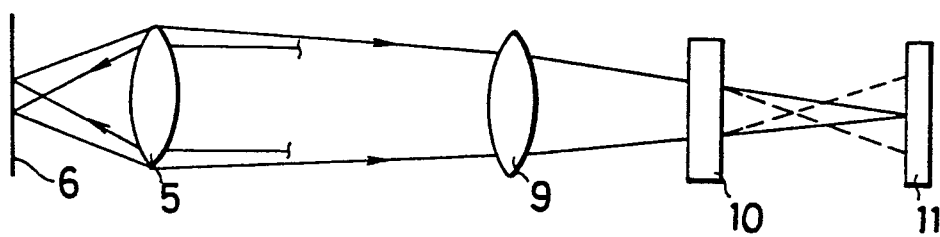
FIG. 3(a) to 3(c) are views of an astigmatic optical system for detecting a focus error signal, respectively, in which 3(a) represents a state in that the optical recording disk is too far away from the objective lens, 3(b) represents a state in that the optical recording disk is in focus, and 3(c) represents a state in that the optical recording disk is too close to the objective lens.

Explanation will now be made in detail as to the method for detecting the focus error, according to the astigmatism method, with reference to FIGS. 3 to 4.

Figure 3B:
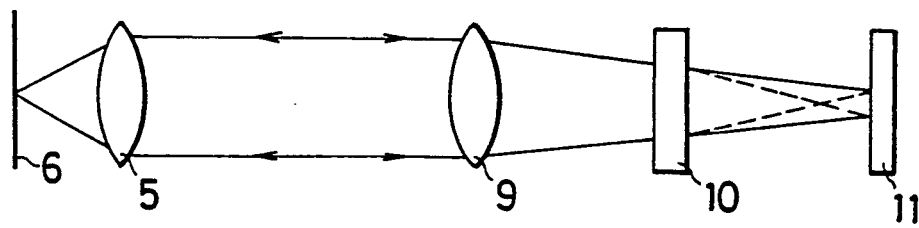
Figure 3C:
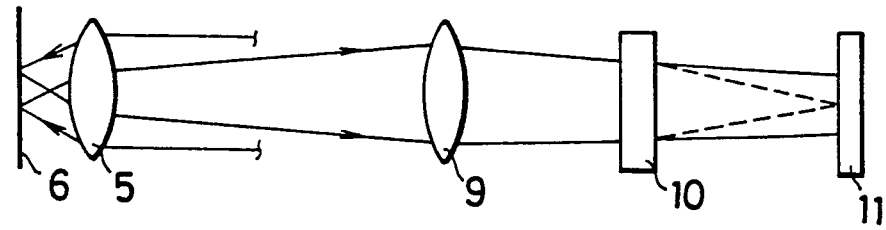
Figure 4A:
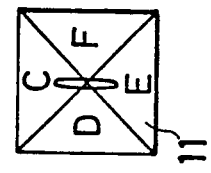
FIGS. 4(a) to 4(c) are views illustrating the respective light receiving states of the four photodetectors shown in FIGS. 3(a) to 3(c), respectively.
Figure 4B:
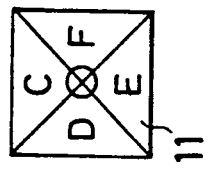
Figure 4C:
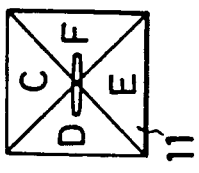

FIG. 3(a) represents a state in that the optical recording disk 6 is too far away from the objective lens 5, and FIG. 3(b) represents a state in that the optical recording disk 6 is in focus, while FIG. 3(c) represents a state in that the optical recording disk 6 is too close to the objective lens 5. FIGS. 4(a) to 4(c) show the shape of beam spots formed on the four photodetectors 11, respectively. FIGS. 4(a) to 4(c) correspond to FIGS. 3(a) to 3(c), respectively, In FIGS. 4(a) to 4(c), the four photodetectors 11 are also designated by reference numerals C, D, E, and F, respectively.

The photodetectors C to F can generate electric signals, respectively, each of which is proportional to the amount of a laser beam incident on the corresponding detector. If the signals from the detectors C to F are given as $V_A$, $V_B$, $V_C$, and $V_D$, the focus error signal $V_{FE}$ is represented as $V_{FE} = (V_B + V_D) - (V_A + V_C)$.

When the optical disk 6 is in focus in relation to the objective lens 5, the beam passed through the cylindrical lens 10 forms a circle on the four detectors C to F, as shown in FIG. 4(b). The circle touches all four detectors C to F evenly. Accordingly, the focus error signal $V_{FE}$ is obtained as $V_{FE} = 0$.

On the other hand, when the disk 6 is out of focus in relation to the objective lens 5, the beam passed through the cylindrical lens 10 forms an oval on the four detectors C to F, as shown in FIGS. 4(a) and 4(c). When the disk 6 is to far away from the objective lens 5, the oval predominantly touches the detectors D and F, as shown in FIG. 4(a). Accordingly, the focus error signal $V_{FE}$ is obtained as $V_{FE} > 0$. Contrarily, when the disk 6 is to close to the objective lens 5, the oval predominantly touches the detectors C and E, as shown in FIG. 4(c). Accordingly, the focus error signal $V_{FE}$ is obtained as $V_{FE} > 0$.

As shown in FIG. 9, the focusing error signal is sent to the lens drive circuit 55. If the optical disk 6 is out of focus, the objective lens actuator 53 is driven by the lens drive circuit 55 to slightly move the objective lens 5 in the focusing direction in relation to the pickup body 51 so as to correct the focus error.

Other known methods for detecting the focus error, such as, for example, Foucault method, beam size method, or knife edge method, may be used instead of the above-mentioned astigmatism method.

Explanation will now be made in detail as to the method for detecting the tracking error, according to the pre-wobbling method, with reference to FIGS. 5 to 7.

Figure 5:
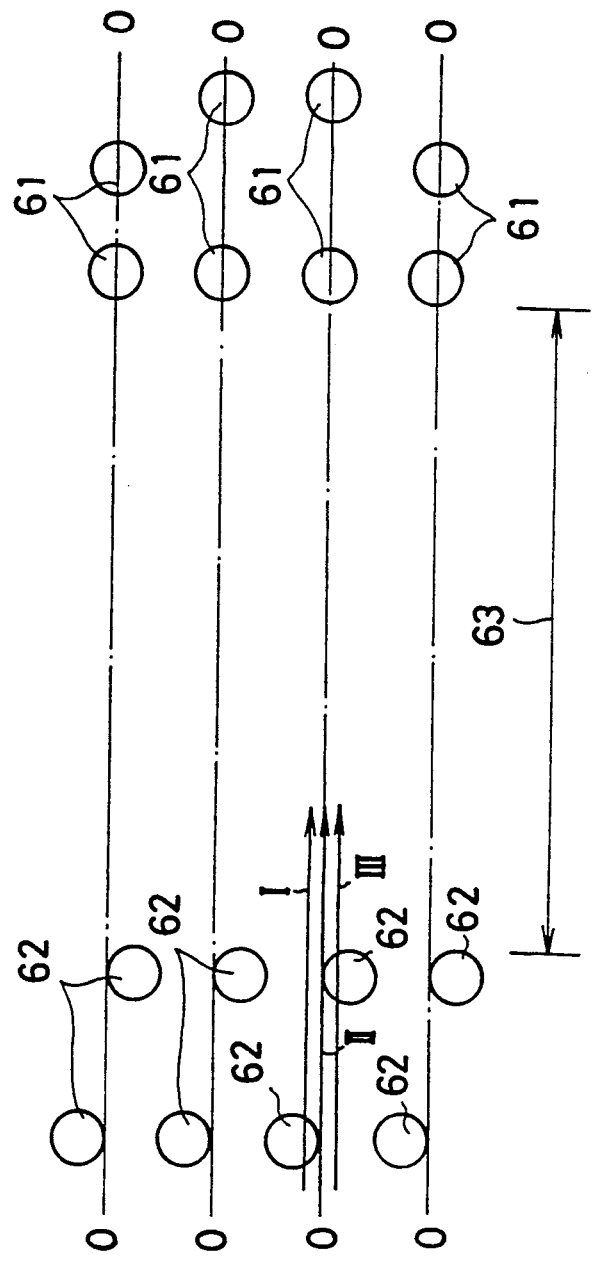
FIG. 5 is an enlarged view of a part of the optical recording disk having pits which are used for a pre-wobbling method for detecting a tracking error.

FIG. 5 is a schematic enlarged view of a part of the information recording surface of the optical disk which is to be used for the pre-wobbling method.

Referring to FIG. 5, a plurality of spaced pits (referred to as information pits, hereinafter) 61 used for the record of information are formed on the information recording surface of the optical disk 6 along the center line O—O of each of the track portions. A pair of additional pits (referred to as error pits, herein after) 62 are also formed on the information recording surface of the optical disk 6 at opposite sides of the center line O—O of each of the track portions, with a spacing therebetween in a direction along the center line O—O of each of the track portions. These error pits 62 are used for the detection of a tracking error, according to the pre-wobbling method. The depth of the error pits 62 is about λ/4 where λ is the wavelength of a laser beam to be used.

Now it is assumed that the beam spot formed by the objective lens 5 moves along an arrow I, II, or III in relation to the center line O—O of one of the track portions. When there is no tracking error, the beam spot moves along the arrow II which is in conformity with the center line O—O of the track. On the other hand, when a tracking error occurs, the beam spot moves along the arrow I or III, for example.

FIGS. 6(a) to 6(c) are views for explaining changes in the intensity of the reflected beam from the optical disk 6, which are obtained when the beam spot moves along the arrows I, II, and III, respectively. In FIGS. 6(a) to 6(c), the beam spot passes through a first pit 62 at the time t1 and through the next pit 62 at the time t2. The more the degree of overlap of the beam spot with the pits 62 is increased, the more the intensity of the reflected beam from the optical disk 6 is decreased. Accordingly, the movements of the beam spot along the arrows I, II, and III causes the intensity of the reflected beam from the optical disk 6 to be changed, as shown in FIGS. 6(a) to 6(c), respectively.

In this embodiment, either the set of two photodetectors 8 or the set of four photodetectors 11, or both of then can be used for detecting the intensity of the reflected beam from the optical disk 6. When the set of two photodetectors 8 is used for the detection of a tracking error, a sum of the output signals from the two photodetectors 8 is detected for the detection of intensity of the reflected beam. Alternatively, when the set of four photodetectors 11 are used for the detection of a tracking error, a sum of the output signals from the four photodetectors 11 is detected for the detection of intensity of the reflected beam. The sum of the output signals obtained at the time t1 is held until the time t2 and compared with the sum of the output signals obtained at the time t2 so as to produce a differential signal as a tracking error signal, as shown in FIGS. 7(a) to 7(c). The tracking error signals shown in FIGS. 7(a) to 7(c)

correspond to the tracking conditions shown in FIGS. 6(a) to 6(c), respectively. In this way, the tracking error signal corresponding to the amount of deviation of the beam spot from the track can be produced.

As shown in FIG. 9, the tracking error signal is sent to the lens drive circuit 55. If tracking is off, the objective lens actuator 53 is driven by the lens drive circuit 55 to slightly move the objective lens 5 in the direction perpendicular to the information track of the optical disk 6 in relation to the pickup body 51 so as to correct the tracking error.

Figure 12A:
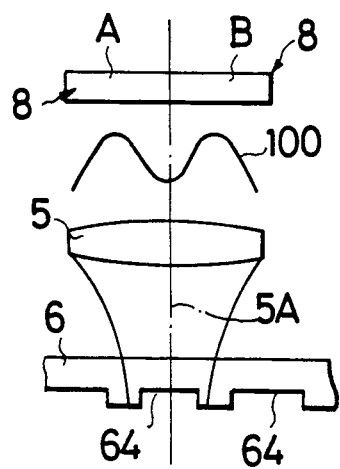
FIGS. 12(a) and 12(b) are views for explaining a method for detecting a tracking error, according to a push-pull method, respectively.
Figure 12B:
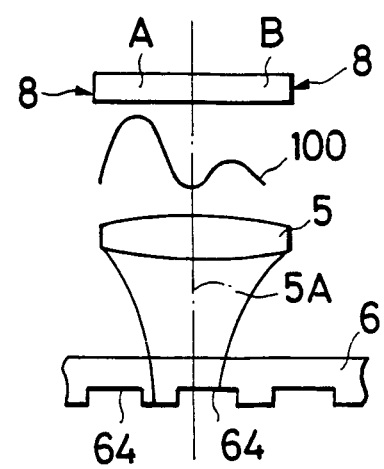
Figure 13:
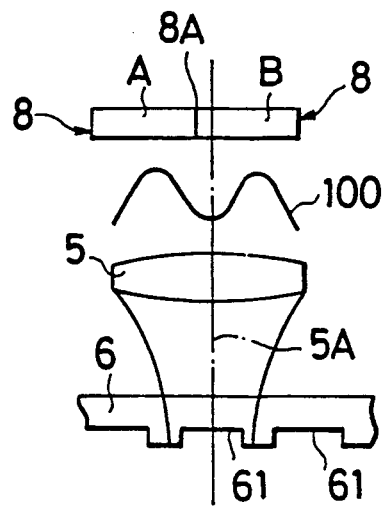
FIG. 13 is a view for explaining a state in that the objective lens axis is deviated from the separation line between the set of two photodetectors during the detection of the tracking error according to the push-pull method.
Figure 14:
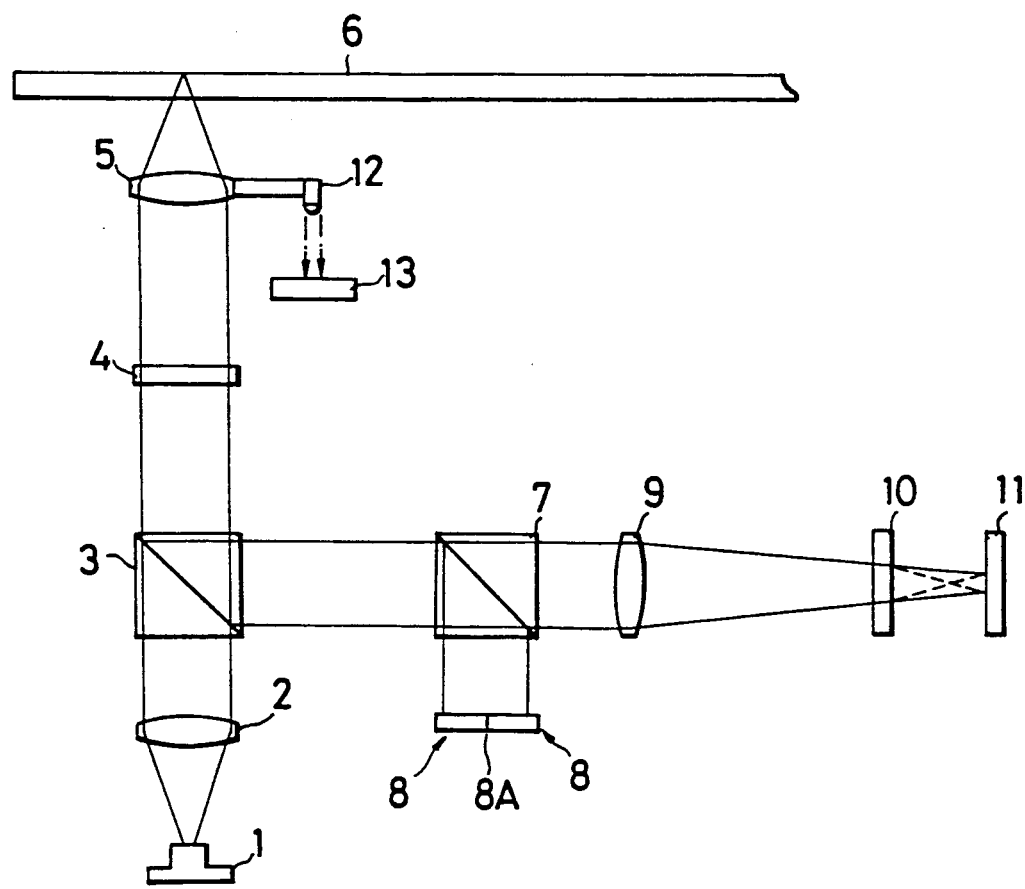
FIG. 14 is a diagrammatic side view of a conventional optical pickup device.

FIGS. 12 to 14 are views for explaining the construction of a conventional optical pickup device, in which the same constituent elements as in the above-mentioned embodiment of the present invention are designated by the same reference numerals.

Referring to FIGS. 12(a) and 12(b), there is shown a method for detecting a tracking error, according to the known push-pull method. The optical disk 6 to be used for the push-pull method is formed with a spiral groove 64 of about λ/8 depth, which is called pregroove, with a track pitch of 1.6 λm. Pits are formed within the pregroove, and information tracks are constructed of the pits and lands between each pit.

FIG. 12(a) shows a state in that the beam spot is accurately on the information track. In this state, the intensity distribution 100 of the diffraction light (i.e., the reflected beam) from the pregroove 64 is symmetrical with respect to the optical axis 5A of the objective lens 5. Further, in the arrangement shown in FIG. 12(a), the optical axis 5A of the objective lens 5 intersects with the separation line 8A between the two photodetectors 8 (A and B). Accordingly, when the beam spot is accurately on the track, the reflected beam from the optical disk 3 strikes the two photodetectors 8 (A and B) evenly.

The two photodetectors A and B produce electric signals, respectively, each of which is proportional to the amount of incident light on the corresponding photodetector. When the electric signals produced by the photodetectors A and B are given as $V_A$ and $V_B$, respectively, a tracking error signal $V_{TE}$ to be produced is represented as $V_{TE} = V_A - V_B$.

Accordingly, if the beam spot is accurately on the track, the tracking error signal $V_{TE}$ is obtained as $V_{TE} = 0$.

If the beam spot is deviated to the left from the center of the pregroove 64, for example, as shown in FIG. 12(b), the intensity distribution 100 of the diffraction light (reflected beam) from the pregroove 64 becomes dissymmetrical with respect to the optical axis 5A of the objective lens 5, causing the tracking error signal $V_{TE}$ to be obtained as $V_{TE} > 0$.

Accordingly, tracking error can be corrected by moving the objective lens 5 on the basis of the tracking error signal $V_{TE}$.

However, if the optical axis 5A of the objective lens 5 is deviated from the separation line 8A between the two photodetectors A and B, as shown in FIG. 13, an error occurs in the tracking error signal $V_{TE}$. In the case shown in FIG. 13, for example, although the intensity distribution 100 of the diffraction light (reflected beam) from the pregroove 64 is symmetrical with respect to the optical axis 5A of the objective lens 5, the same is dissymmetrical with respect to the separation line 8A between the photodetectors A and B. In this case, accordingly, the tracking error signal $V_{TE}$ is obtained as $V_{TE} < 0$, which causes the objective lens 5 to be adjusted inaccurately by the objective lens actuator.

In order to decrease the above-mentioned error in the tracking error signal, in the conventional optical pickup device, as shown in FIG. 14, a light emitting diode 12 is attached to the objective lens 5, and an additional photodetector 13 for detecting light emitted from the light emitting diode 12 is attached to the movable body (not illustrated) of the optical pickup device. Based on a detection signal produced by the detector 13, the objective lens 5 is adjusted so that the optical axis 5A thereof is met with the separation line 8A between the two photodetectors 8.

However, the provision of the above-mentioned light emitting diode 12 and additional photodetector 13 causes the optical pickup device to be increased in size and complicated in construction. Particularly, the light emitting diode 12 secured to the objective lens 5 causes the load of the objective lens actuator to be increased, requiring a large-sized and complicated objective driving system including the objective lens actuator.

In comparison to the push-pull method, the above-described pre-wobbling method has an advantage in that it enables the tracking error signal to be produced with less error, even if there is a deviation of the optical axis of the objective lens 5 with respect to the photodetectors. This is because only the intensity of the reflected beam from the optical disk 6 is detected, according to the pre-wobbling method.

However, it is desirable to eliminate a deviation of the optical axis of the objective lens 5 with respect to the photodetectors by the following reasons.

a) The deviation of the optical axis of the objective lens 5 also causes the focus error signal to be produced with an error.

b) The size of the beam spot formed on the optical disk is deteriorated by the deviation of the optical axis of the objective lens 5, because a collimated beam incident on the objective lens is partly out of the effective aperture thereof due to the deviation of the optical axis of the objective lens.

c) It may occur that the objective lens bumps against the inside of the objective lens actuator, when the objective lens moving in the tracking direction is not followed by the optical pickup body.

Therefore, it is necessary to detect the position of the optical axis of the objective lens, even if the pre-wobbling method for detecting the tracking error is used.

Explanation will now be made as to the method for detecting the position of the optical axis of the objective lens 5.

As shown in FIG. 5, the section between the series of information pits 61 and the pair of error pits 62 on each of the track portion of the optical disk 6 is a plane mirror portion 63 which is used for the detection of the position of the optical axis of the objective lens 5, and accordingly, any pit or information data is not formed thereon. Namely, the laser beam reflected by the plane mirror portion 63 of the optical disk 6 is used for the detection of the position of the optical axis of the objective lens 5.

Referring to FIG. 2, the laser beam is sprit by the beam splitter 7 into two beams, and one of the beams coming from the beam splitter 7 falls on the set of two photodetectors 8 which are separated from one another with a separation line 8A, as mentioned above. In FIGS. 8(a) and 8(b), the two photodetectors 8 are also designated by reference numerals A1 and B1.

In this embodiment, the photodetectors A1 and B1 are respectively adapted to generate an electric signal which is proportional to the amount of a laser beam incident on the corresponding photodetector. A lens position detection signal is obtained by comparing the two electric signals from the photodetectors A1 and B1, as described later in more detail. For this purpose, the arrangement of the two photodetectors A1 and B1 is such that the separation line 8A extends in a direction which is optically parallel to a tangent to the information track of the optical disk 6.

In the arrangement of the optical system shown in FIG. 2, the separation line 8A is mechanically parallel to a tangent to the information track of the optical disk 6. However, the separation line 8A may not be mechanically parallel to the tangent to the information track of the optical disk 6, as far as it is optically parallel to the tangent to the information track of the optical disk 6.

The two photodetectors A1 and B1 is located far away from the converging point of the reflected beam coming from the beam splitter 7.

Referring to FIG. 8(a), there is shown a normal positional relationship between the optical axis of the objective lens 5 and the photodetectors 8 (A1, B1), as well as the intensity distribution 101 of the reflected laser beam from the plane mirror portion 63 of the optical disk 6. In this normal state, as shown in FIG. 8(a), the reflected laser beam from the plane mirror portion 63 of the optical disk 6 can touch the two photodetectors A1 and B1 evenly. Namely, the two photodetectors A1 and B1 receive the same amount of the laser beam.

The two photodetectors A1 and B1 are respectively adapted to generate an electric signal which is proportional to the amount of a laser beam incident on the corresponding photodetector. A lens position detection signal is obtained by comparing the two electric signals from the photodetectors A1 and B1. When the electric signals produced by the photodetectors A1 and B1 are given as $V_{A1}$ and $V_{B1}$, respectively, the lens position detection signal $V_{LE}$ to be produced is represented as $V_{LE} = V_{A1} - V_{B1}$.

Accordingly, if the optical axis of the objective lens 5 is in the normal position with respect to the two photodetectors A1 and B1, as shown in FIG. 8(a), the lens position detection signal $V_{LE}$ is obtained as $V_{LE} = 0$.

If the optical axis of the objective lens 5 is deviated from the separation line 8A between the two photodetectors A1 and B2, as shown in FIG. 8(b), the intensity distribution 101 of the reflected laser beam from the plane mirror portion 63 of the optical disk 6 becomes dissymmetrical with respect to the separation line 8A between the two photodetectors A1 and B2, causing the lens position detection signal $V_{LE}$ to be obtained as $V_{LE} \neq 0$. Namely, the lens position detection signal $V_{LE}$ corresponds to the amount of deviation of the optical axis of the objective lens 5 from the separation line 8A between the two photodetectors A1 and B1.

Based on the lens position detection signal, the seek motor 52 is driven by a seek motor drive circuit 54 (see FIG. 10) to move the pickup body 51 in the seeking direction perpendicular to the information track of the optical disk 6, in relation to the optical disk 6.

As the pickup body 51 is moved by the seek motor 52, the objective lens 5 is also moved together with the pickup body 51 in the same direction. However, the objective lens 5 is moved by the objective lens actuator 53 in relation to the pickup body 51 in accordance with the above-described tracking error signal, according to the pre-wobbling method. As the result, the pickup body 51 and the objective lens 5 are kept at the normal position in relation to the optical disk 6 in the direction perpendicular to the information track of the optical disk 6.

Accordingly, the optical pickup device of the first embodiment makes it possible to detect the deviation of the position of the optical axis of the objective lens 5 in relation to the set of four photodetectors 11 and the set of two photodetectors 11 which are used for detecting the focus and tracking errors of the optical disk 6 in relation to the optical pickup device, respectively, with a simple and compact drive system for driving the objective lens 5. Therefore, it is possible to detect accurately the focus and tracking errors of the optical disk 6 in relation to the optical pickup device, with a simple and compact-sized construction of the optical pickup device.

Alternatively, it is possible to use the set of four photodetectors 11 for the detection of the position of the optical axis of the objective lens 5.

Figure 11:
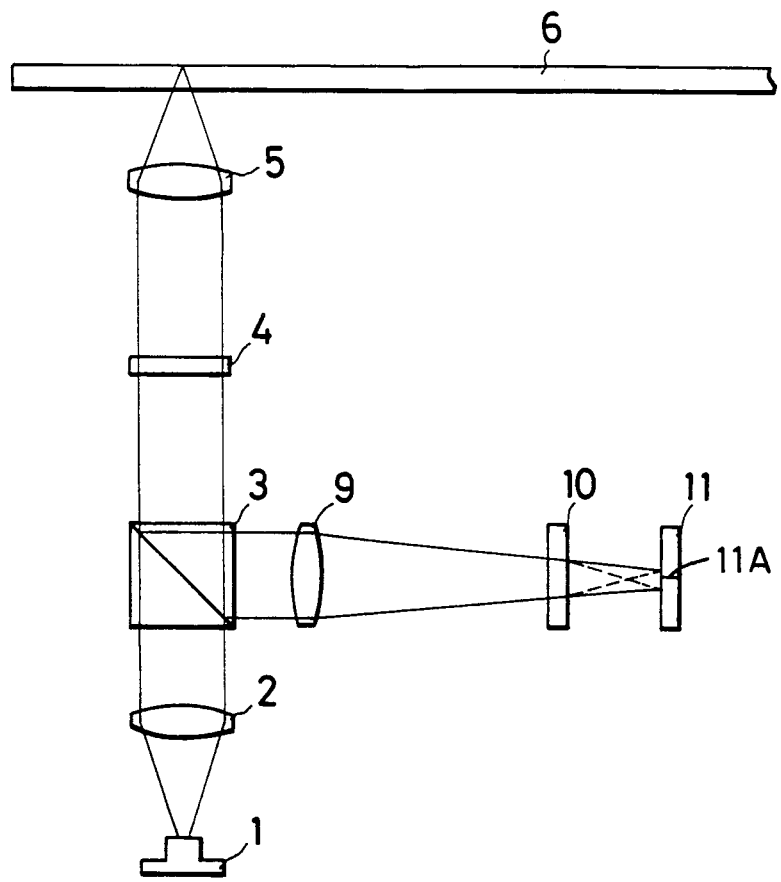
FIG. 11 is a diagrammatic side view of an optical pickup device according to another preferred embodiment of the present invention.

FIG. 11 illustrates another embodiment of the present invention, in which the same constituent elements as those in the first embodiment are designated by the same reference numerals. In the second embodiment, the optical system of the optical pickup device is so constructed as to obtain a tracking error signal, information signal, focus error signal, and lens position detection signal from only a set of four photodetectors 11. In this case, therefore, the set of four photodetectors 11 is so arranged as to have a separation line 11A which is optically parallel to a tangent to the information track of the optical disk 6.

According to this arrangement of the set of the four photodetectors 11, it is possible to obtain the lens position detection signal from the output signals of at least two photodetectors 11 which are located at opposite sides of the separation line 11A, by carrying out a differential signal producing process which is similar to that used in the first embodiment. Further, the tracking error signal can be obtained by the pre-wobbling method in which all the four photodetectors 11 together are used for detecting the amount of light reflected by the information recording surface of the optical disk 6.

A beam splitter and a set of the two photodetectors which have been used in the first embodiment are not necessary in the second embodiment, as shown in FIG. 11.

The construction and function of the constitutional elements of the second embodiment are substantially the same as those in the first embodiment except for the above-described matters.

Accordingly, the optical pickup device of the second embodiment makes it possible to detect the deviation of the position of the optical axis of the objective lens 5 in relation to the four photodetectors 11 which are used for detecting the focus and tracking errors of the optical disk 6 in relation to the optical pickup device, with a simple and compact drive system for driving the objective lens 5. Therefore, it is possible to detect accurately the focus and tracking errors of the optical disk 6 in relation to the optical pickup device, with a simple and compact-sized construction of the optical pickup device.

While the invention has been described in conjunction with specific embodiments thereof, it is evident that many alternatives and modifications will be apparent to those skilled in the art in light of the foregoing description. Accordingly, it is intended to include all such alternatives and modifications as fall within the spirit and scope of the appended claims.

What is claimed is:

1. An optical pickup device for recording on and/or reproducing optical information from an optical recording disk having an information recording surface, comprising:

an objective lens for converging a light beam directed thereto from a light source onto the information recording surface of the optical recording disk to form a beam spot on an information track of the information recording surface;

a first light detecting unit disposed on a movable pickup body and having at least two photodetectors, each of the photodetectors receiving a light beam reflected from a plane mirror portion formed on the information track of the information recording surface and producing an output signal related to the received amount of the reflected light beam; and driving means for moving the movable pickup body such that an output signal produced by one of the at least two photodetectors becomes equal to an output signal produced by another of the at least two photodetectors when said output signals differ from each other, in order to keep coincident with each other an optical axis of the objective lens and an axis of the light beam directed to the objective lens.

2. An optical pickup device according to claim 1, in which the optical recording disk has a pair of error pits formed at one end of the plane mirror portion and located at opposite sides of a center line of the information track of the information recording surface and spaced from one another in a direction along the center line of the information track for detecting a tracking error when the beam spot passes through at least one of the pair of error pits, and information pits formed at another end of the plane mirror portion, at the center line of the information track, for recording and/or reproduction of the optical information.

3. An optical pickup device according to claim 1, in which the optical pickup device disposed on a movable pickup body further comprises a second light detecting unit having four photodetectors, each of said four photodetectors receiving the reflected light beam from the plane mirror portion and producing a respective output signal related to the received amount of the reflected light beam, and still further comprises means for correcting a focus error of the objective lens based on the respective signals produced by said four photodetectors of the second light detecting unit when the respective output signals produced by said four photodetectors of the second unit are not equal to each other.

4. An optical pickup device for recording information in and/or reading information from a recording disk, said disk having an information recording surface on which an information track is defined amd said track including a plane mirror portion, comprising:

a light source generating an incident light beam and an objective lens which receives the incident beam and causes the beam to converge into a spot on said track and to be reflected from said track and to thereby forma a reflected light beam;

a pickup body which is movable relative to said disk and has a first light detecting unit comprising at least two photodetectors which are separated from each other by a separation line and each of which receives a respective portion of said reflected beam and produces a respective output signal related to the received amount of light; and driving means responsive to said output signals to move the movable pickup body to cause the output signals from said at least two photodetectors to conform to each other when said photodetectors are receiving the beam reflected from said plane mirror portion of said track and thereby to cause the separation line between the at least two detectors to coincide optically with a selected optical axis of the reflected beam.

5. An optical pickup device according to claim 4, in which said disk has a pair of error pits which are formed at one end of said plane mirror portion of the track and are located at opposite sides of a center line of said track and are spaced from one another in a direction along the center line of the track for detecting a tracking error when the beam spot passes through at least one of said error pits, and information pits formed at another end of the plane mirror portion of said track, at the center line of the track, for recording information in and/or reproducting information from the disk.

6. An optical pickup device according to claim 4, in which the optical pickup device which is on a movable pickup body further comprises a second light detecting unit having at least four photodetectors, each of said at least four photodetectors receiving the reflected light beam and producing a respective output signal related to the received amount of light when the beam is reflected from said plane mirror portion of the track, and still further comprises a focus error correcting circuit for correcting a focus error of the objective lens based on the respective output signals produced by said at least four photodetectors of the second light detecting unit.

* * * * *